United States Patent
Shibata et al.

(10) Patent No.: US 8,255,143 B2
(45) Date of Patent: Aug. 28, 2012

(54) DIAGNOSTIC SYSTEMS AND METHODS FOR SENSORS IN HOMOGENOUS CHARGE COMPRESSION IGNITION ENGINE SYSTEMS

(75) Inventors: Jonathan T. Shibata, Whitmore Lake, MI (US); Andrew P Bagnasco, Plymouth, MI (US)

(73) Assignee: GM Global Technology Operations LLC

( * ) Notice: Subject to any disclaimer, the term of this patent is extended or adjusted under 35 U.S.C. 154(b) by 624 days.

(21) Appl. No.: 12/512,459

(22) Filed: Jul. 30, 2009

(65) Prior Publication Data
US 2011/0029216 A1  Feb. 3, 2011

(51) Int. Cl.
*G01M 15/02* (2006.01)
*G01M 15/00* (2006.01)
(52) U.S. Cl. ............... 701/111; 123/27 R; 73/114.31
(58) Field of Classification Search .......... 701/101, 701/103, 114; 123/27 R, 295, 431, 305, 123/198 D; 73/114.31, 114.32, 114.36, 114.37, 73/114.77
See application file for complete search history.

(56) References Cited

U.S. PATENT DOCUMENTS

| | | | | |
|---|---|---|---|---|
| 8,091,531 B2 * | 1/2012 | Lucido et al. | ........... | 123/446 |
| 8,099,231 B1 * | 1/2012 | Suwa | ........... | 701/111 |
| 2010/0294239 A1 * | 11/2010 | Mc Lain et al. | ........... | 123/344 |

\* cited by examiner

*Primary Examiner* — Mahmoud Gimie

(57) ABSTRACT

An engine control system for a homogenous charge compression ignition (HCCI) engine includes an airflow determination module and a sensor diagnostic module. The airflow determination module generates a first plurality of estimates of airflow into the HCCI engine when the HCCI engine is operating in a first combustion mode, wherein the first plurality of estimates are based on an intake manifold absolute pressure (MAP), a mass air flow (MAF) rate, and a camshaft position. The sensor diagnostic module determines a state of at least one of a first plurality of sensors based on a predetermined threshold and differences between one of the first plurality of estimates and others of the first plurality of estimates, wherein the first plurality of sensors includes a MAP sensor, a MAF sensor, and a camshaft sensor.

20 Claims, 3 Drawing Sheets

DIAGNOSTIC SYSTEMS AND METHODS FOR SENSORS IN HOMOGENOUS CHARGE COMPRESSION IGNITION ENGINE SYSTEMS

FIELD

The present disclosure relates to homogenous charge compression ignition (HCCI) engine systems and more particularly to diagnostic systems and methods for sensors in HCCI engine systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Homogenous charge compression ignition (HCCI) engines combust an air/fuel (A/F) mixture within cylinders to produce drive torque. HCCI engines may combust the A/F mixture in different combustion modes. For example, in an HCCI combustion mode the A/F mixture may be automatically ignited when compressed by pistons (i.e. compression ignition). Alternatively, for example, in a spark ignition (SI) combustion mode the A/F mixture may be ignited by spark plugs in the cylinders after the pistons compress the A/F mixture.

HCCI combustion mode may improve engine efficiency and/or fuel economy compared to SI combustion mode. However, HCCI combustion mode may be limited to a predetermined HCCI operating zone in order to reduce combustion noise and protect the engine from damage due to excessive pressure increases associated with HCCI. Therefore, pressure sensors may be implemented in one or more of the cylinders and may be used to monitor cylinder pressure, particularly during HCCI combustion mode.

Furthermore, HCCI combustion mode may require precise A/F ratio control to prevent increased emissions. More specifically, lower peak temperatures during combustion (compared to SI combustion mode) may lead to incomplete burning of fuel. Therefore, carbon monoxide (CO) and/or hydrocarbon (HC) pre-catalyst emissions may be higher during HCCI combustion mode than in spark ignition combustion mode. For example, the increased CO and/or HC emissions may be higher during HCCI combustion mode due to incomplete oxidation and/or trapped crevice gases, respectively.

SUMMARY

An engine control system for a homogenous charge compression ignition (HCCI) engine includes an airflow determination module and a sensor diagnostic module. The airflow determination module generates a first plurality of estimates of airflow into the HCCI engine when the HCCI engine is operating in a first combustion mode, wherein the first plurality of estimates are based on an intake manifold absolute pressure (MAP), a mass air flow (MAF) rate, and a camshaft position. The sensor diagnostic module determines a state of at least one of a first plurality of sensors based on a predetermined threshold and differences between one of the first plurality of estimates and others of the first plurality of estimates, wherein the first plurality of sensors includes a MAP sensor, a MAF sensor, and a camshaft sensor.

A method for operating a homogenous charge compression ignition (HCCI) engine includes generating a first plurality of estimates of airflow into the HCCI engine when the HCCI engine is operating in a first combustion mode, wherein the first plurality of estimates are based on an intake manifold absolute pressure (MAP), a mass air flow (MAF) rate, and a camshaft position; and determining a state of at least one of a first plurality of sensors based on a predetermined threshold and differences between one of the first plurality of estimates and others of the first plurality of estimates, wherein the first plurality of sensors includes a MAP sensor, a MAF sensor, and a camshaft sensor.

Further areas of applicability will become apparent from the description provided herein. The description and specific examples in this summary are intended for purposes of illustration only and are not intended to limit the scope of the present disclosure.

DRAWINGS

The present disclosure will become more fully understood from the detailed description and the accompanying drawings, wherein.

DETAILED DESCRIPTION

Figure 1:
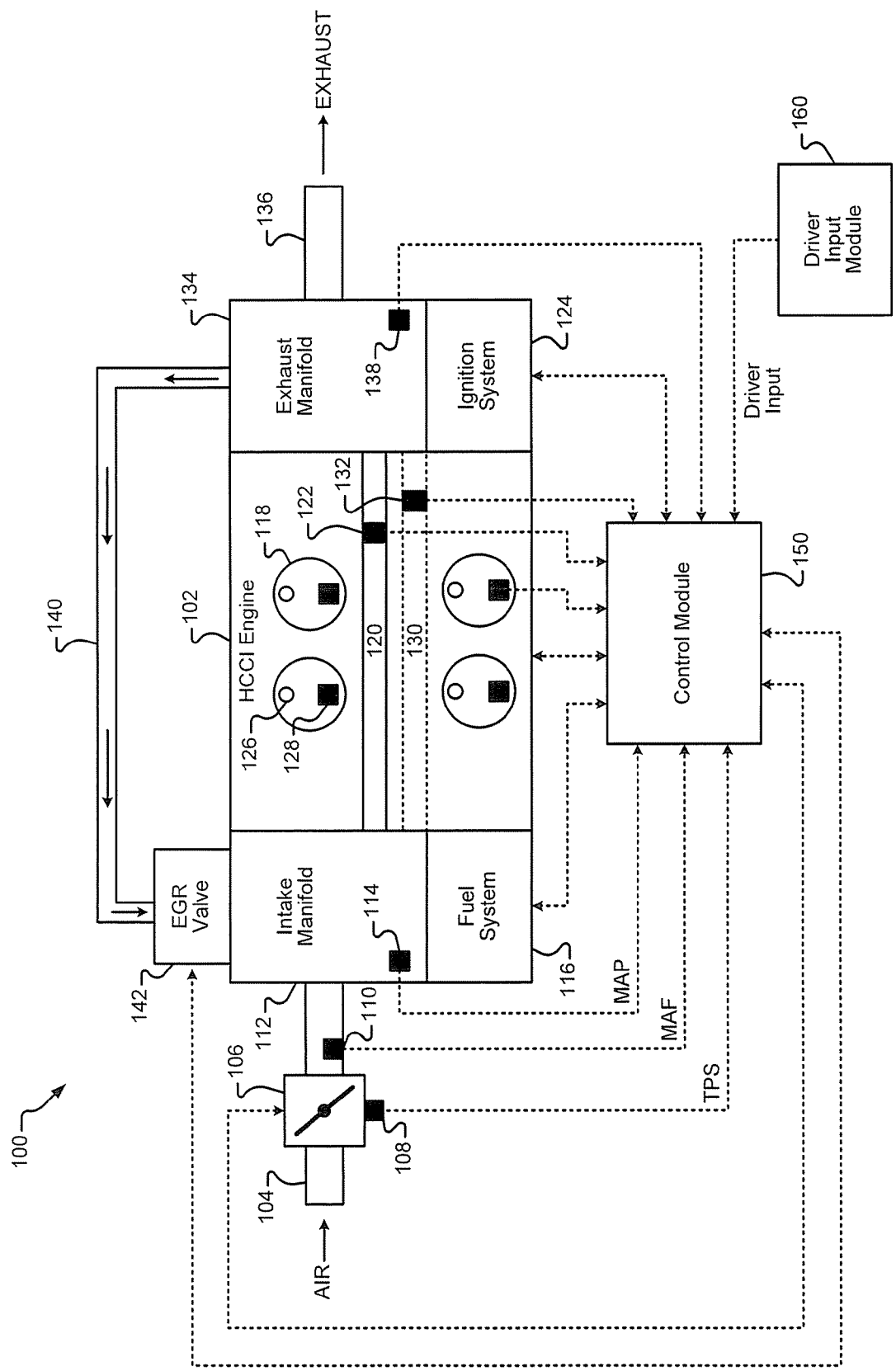
FIG. 1 is a functional block diagram of an exemplary homogenous charge compression ignition (HCCI) engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

HCCI engine systems may require precise A/F ratio control to prevent increased emissions during HCCI combustion mode. Thus, accurate measurement of airflow into the HCCI engine may be required to precisely control the airflow into and/or fuel supplied to the HCCI engine. The airflow into the HCCI engine may be estimated based on measurements from a plurality of different sensors. Therefore, each of the plurality of sensors may require diagnostics to determine whether the sensor is in a failure state and thus negatively affecting the accuracy of the airflow measurement.

For example, the plurality of sensors used to estimate airflow may include an intake manifold absolute pressure (MAP) sensor, a mass air flow (MAF) sensor, and a throttle position sensor (TPS). The MAP sensor may measure pressure inside the intake manifold. The MAF sensor may measure a rate of airflow into the intake manifold. The TPS may measure a relative position of the throttle (e.g., ranging from 0%, or closed, to 100%, or wide-open).

Typically, the MAP sensor, the MAF sensor, and the TPS sensor may be used collectively to determine whether one is in the failure state. For example only, differences may be determined between each of the airflow estimates and the differences may then be compared to predetermined thresholds to determine whether one of the sensors is in the failure state.

However, HCCI combustion mode requires commanding the throttle to an open position and controlling engine power output via fuel injection, similar to a diesel engine. Thus, the TPS sensor may not be used for diagnosing the failure state of one of the plurality of sensors when the HCCI engine is in HCCI combustion mode because the throttle position is static (i.e. not changing).

Therefore, systems and methods are presented that estimate airflow into an HCCI engine that is operating in HCCI combustion mode based on the MAP sensor, the MAF sensor, and a camshaft sensor. Thus, the systems and methods presented may diagnose a failure state of the MAP sensor, the MAF sensor, and/or the camshaft sensor during HCCI combustion mode. For example only, the systems and methods presented may diagnose a failure state of one of the plurality of sensors based on differences between each of the estimates and predetermined thresholds.

Furthermore, the systems and methods presented may estimate airflow into the HCCI engine when the HCCI engine is operating in SI combustion mode based on the MAP sensor, the MAF sensor, the camshaft sensor, and the TPS sensor. For example only, the systems and methods presented may diagnose a failure state of one of the sensors based on differences between each of the estimates and predetermined thresholds. In other words, incorporating an additional airflow estimate using the camshaft sensor may improve airflow estimation accuracy and/or sensor diagnostic accuracy (i.e. more estimations) compared to conventional diagnostic systems and methods.

Referring now to FIG. 1, an exemplary implementation of an HCCI engine system 100 is shown. The HCCI engine system 100 includes an HCCI engine 102, an air inlet 104, a throttle 106, a TPS sensor 108, a MAF sensor 110, an intake manifold 112, and an intake MAP sensor 114.

Air is drawn into the HCCI engine 102 into the intake manifold 112 through the air inlet 104 that is regulated by the throttle 106. The TPS sensor 108 may generate a TPS signal based on a relative position of the throttle 106. The MAF sensor 110 may generate a MAF signal based on a mass air flow into the HCCI engine 102. For example, an engine load may be determined based on the signal from the MAF sensor 110. The MAP sensor 114 may generate a MAP signal based on a pressure inside the intake manifold 112.

The HCCI engine system 100 further includes a fuel system 116, a plurality of cylinders 118, a camshaft 120, an camshaft sensor 122, an ignition system 124, a plurality of spark plugs 126, a plurality of cylinder pressure sensors 128, a crankshaft 130, and a crankshaft sensor 132.

Air inside the intake manifold 112 may be distributed to the plurality of cylinders 118. While four cylinders 118 are shown, it can be appreciated that the HCCI engine 102 may include other numbers of cylinders. The camshaft 120 actuates intake valves (not shown) that selectively open and close to enable the air from the intake manifold 112 to enter the cylinders 118. While one camshaft 120 is show, it can be appreciated that more than one camshaft 120 may be implemented (e.g. dual overhead camshafts). The camshaft sensor 122 generates a camshaft phaser signal based on an angular position of the camshaft 120. In other words, the camshaft phaser signal may correspond to a position of the intake and/or exhaust valves (not shown), and thus may be used to estimate airflow into the HCCI engine 102.

The fuel system 116 may inject fuel into the intake manifold 112 at a central location (i.e central port injection, or CPI) or may inject fuel into the intake manifold 112 at multiple locations (i.e. multi-port injection, or MPI). Alternatively, the fuel system 116 may inject fuel directly into the cylinders 118 (i.e. direct fuel injection). The air mixes with the injected fuel to form the A/F mixture in the cylinders 118. Cylinder pressure sensors 128 continuously measure pressure inside the cylinders 118. For example only, the HCCI engine 102 may switch from HCCI combustion mode to Si combustion mode when pressure in one or more of the cylinders 118 is greater than a predetermined threshold.

Pistons (not shown) within the cylinders 118 compress the A/F mixture. At low-to-medium engine loads and low-to-medium engine speeds, the A/F mixture is automatically ignited when compressed (i.e. compression ignition). Here, the HCCI engine system 100 is operating in the HCCI combustion mode. Otherwise, the ignition system 124 may ignite the A/F mixture or provide spark assist during HCCI operation via the spark plugs 126. Here, the HCCI engine system 100 is operating in the SI combustion mode. The combustion of the A/F mixture drives the pistons down, thereby rotatably driving the crankshaft 130 to produce the drive torque. The crankshaft sensor 132 may generate an engine speed signal based on a rotational speed (e.g. in revolutions per minute, or RPM) of the crankshaft 130.

The HCCI engine system 100 further includes an exhaust manifold 134, an exhaust outlet 136, an exhaust back pressure (EBP) sensor 138, an exhaust gas recirculation (EGR) line 140, and an EGR valve 142.

As previously mentioned, the camshaft 120 also actuates exhaust valves (not shown) that selectively open and close to enable combustion exhaust from the cylinders 118 to enter the exhaust manifold 134. The exhaust gas may then be forced out of the engine system through the exhaust outlet 136. The EBP sensor 138 may measure pressure of the exhaust gas in the exhaust manifold 134.

The EGR line 140 and the EGR valve 142 may also introduce exhaust gas into the intake manifold 112. More specifically, the EGR line 140 extends from the exhaust manifold 134 to the EGR valve 142, and the EGR valve 142 may be mounted on the intake manifold 112 (as shown). Thus, the EGR valve 142 may selectively open and close to enable exhaust gas to enter the intake manifold 112. For example, recirculation of exhaust gas may lower peak combustion temperatures, and thus may increase efficiency of the HCCI engine 102.

The control module 150 controls operation of the HCCI engine system 100 based on driver input and various engine operating parameters. More specifically, the control module 150 may receive driver input from a driver input module 160. For example only, the driver input module 160 may be an accelerator pedal and the driver input may correspond to a position (i.e. depression) of the accelerator pedal.

The control module 150 controls and communicates with the HCCI engine 102, the throttle 106 (e.g. via electronic throttle control, or ETC), the fuel system 116, the ignition system 124, and the EGR valve 140. The control module 150 also receives signals from the TPS sensor 108, the MAF sensor 110, the MAP sensor 114, the camshaft phaser sensor 122, the cylinder pressure sensors 128, the crankshaft sensor 132, and the EBP sensor 138.

Figure 2:
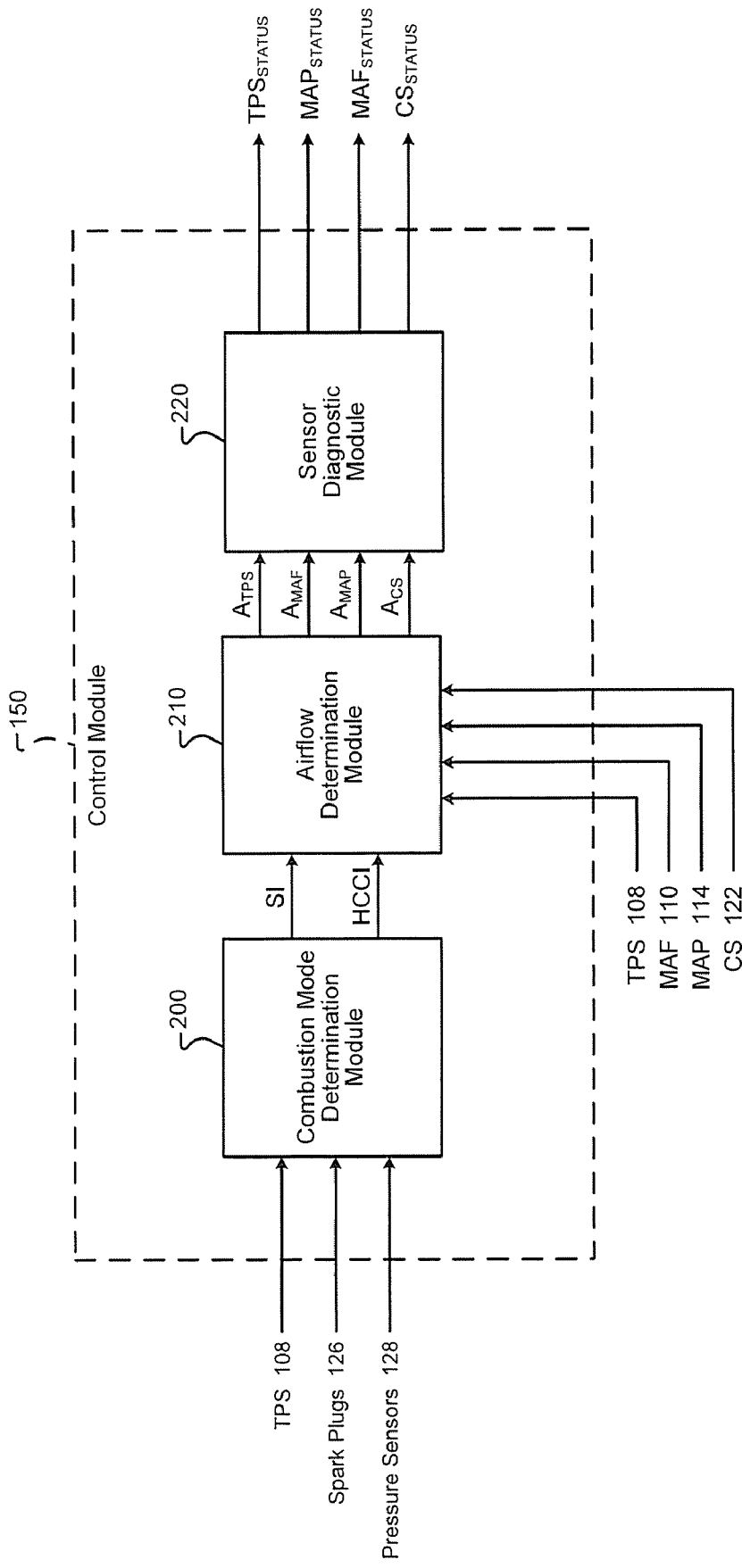
FIG. 2 is a functional block diagram of an exemplary control module according to the present disclosure.

Referring now to FIG. 2, the control module 150 is shown in more detail. The control module 150 may include a combustion mode determination module 200, a airflow determination module 210, and a sensor diagnostic module 220.

The combustion mode determination module 200 receives a plurality of signals corresponding to the combustion mode of the HCCI engine 102. The combustion mode determination module 200 determines which combustion mode the engine system 100 is operating in based on the received signals. In other words, the combustion mode determination module 200 may determine whether the engine 102 is operating in SI combustion mode or HCCI combustion mode.

For example, the combustion mode determination module 200 may receive signals from the TPS sensor 108, the spark plugs 126, and the cylinder pressure sensors 128. However, it can be appreciated that other status signals may be used in determining the combustion mode of the HCCI engine 102. For example only, the combustion mode determination module 200 may determine that the HCCI engine 102 is operating in HCCI combustion mode when the TPS signal from the TPS sensor 108 does not change over a period of time (i.e. the throttle 106 is being held open). Alternatively, for example only, the combustion mode determination module 200 may determine that the HCCI engine 102 is operating in HCCI combustion mode when the spark plugs 126 are deactivated. Lastly, for example only, the combustion mode determination module 200 may determine that the HCCI engine 102 is operating in HCCI combustion mode when cylinder pressure from the cylinder pressure sensors 128 is less than a predetermined threshold.

The airflow determination module 210 receives the current combustion mode of the HCCI engine 102. The airflow determination module 210 also receives signals from the TPS sensor 108, the MAF sensor 110, the MAP sensor 114, and the camshaft sensor 122. The airflow determination module 210 may generate airflow estimates based on each of the received signals and the combustion mode of the HCCI engine 102.

More specifically, when the engine 102 is operating in SI combustion mode, the airflow determination module 210 generates an airflow estimate based on each of the TPS signal, the MAF signal, the MAP signal, and the camshaft signal.

However, when the engine 102 is operating in HCCI combustion mode, the airflow determination module 210 generate an airflow estimate based on each of the MAF signal, the MAP signal, and the camshaft signal. In other words, during HCCI combustion mode the throttle 106 is held open, and thus the TPS signal may not be used to estimate airflow.

The sensor diagnostic module 220 receives the airflow estimates corresponding to the MAF signal, the MAP signal, and the camshaft signal. The sensor diagnostic module 220 may also receive the airflow estimate corresponding to the TPS signal when the engine 102 is operating in HCCI combustion mode.

The sensor diagnostic module 220 determines a state of one of the TPS sensor 108, the MAF sensor 110, the MAP sensor 114, and the camshaft phaser sensor 122. More specifically, the sensor diagnostic module 220 compares the plurality of estimates to determine whether any of the plurality of sensors are in a failure state. For example, the sensor diagnostic module 220 may determine differences between each of the estimates, and then may compare the estimates to predetermined thresholds.

For example only, if differences between one of the signals and the other signals is greater than a predetermined threshold, the sensor diagnostic module 220 may determine that the sensor corresponding to the one of the signals is in the failure state. Therefore, when the sensor is in the failure state, the sensor may not be used when determining airflow into the HCCI engine 102. Furthermore, an error signal (e.g. an error flag) may be generated corresponding to the failed sensor.

Figure 3:
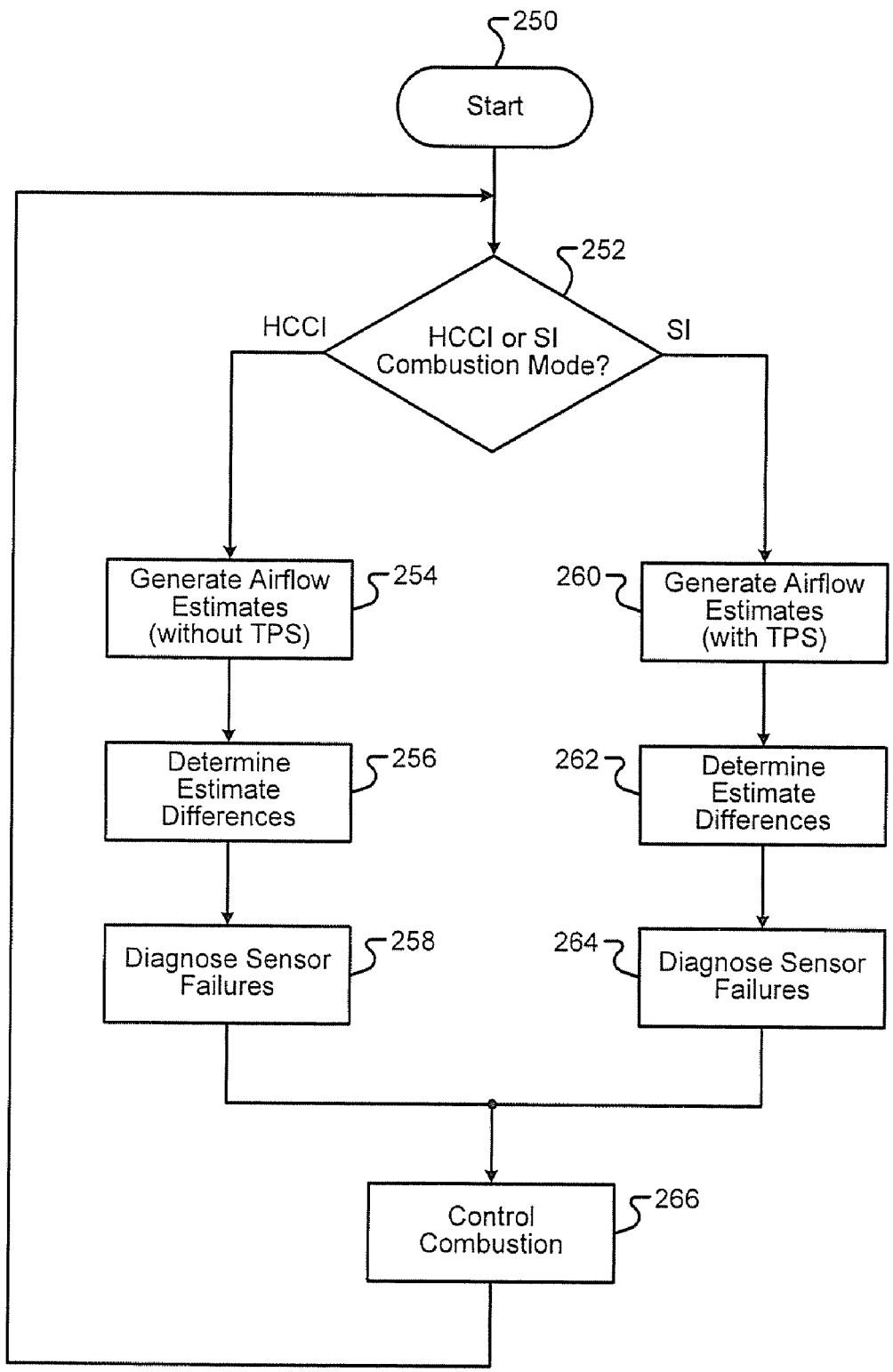
FIG. 3 is a flow diagram of a method for determining sensor failures in an HCCI engine system according to the present disclosure.

Referring now to FIG. 3, a method of operating the HCCI engine system 100 begins in step 250. In step 252, the control module 150 determines whether the HCCI engine 102 is operating in HCCI combustion mode or SI combustion mode. If the HCCI engine 102 is operating in HCCI combustion mode, control may proceed to step 254. Otherwise, if the HCCI engine 102 is operating in SI combustion mode (i.e. default), control may proceed to step 260.

In step 254, the control module 150 generates airflow estimates based on signals from the MAF sensor 110, the MAP sensor 114, and the camshaft sensor 122. In other words, the control module 150 may not generate an airflow estimate based on the TPS signal from the TPS sensor 108.

In step 256, the control module 150 may determine differences between each of the plurality of airflow estimates. In step 258, the control module 150 may determine whether any of the plurality of sensors are in the failure state. For example, if one of the sensors is in the failure state the control module 150 may disregard the corresponding estimate when estimating airflow and/or may generate an error signal for the sensor. Control may then proceed to step 266.

In step 260, the control module 150 generates airflow estimates based on signals from the MAF sensor 110, the MAP sensor 114, the camshaft sensor 122, and the TPS sensor 108.

In step 262, the control module 150 may determine differences between each of the plurality of airflow estimates. In step 264, the control module 150 may determine whether any of the plurality of sensors are in the failure state. For example, if one of the sensors is in the failure state the control module 150 may disregard the corresponding estimate when estimating airflow and/or may generate an error signal for the sensor. Control may then proceed to step 266.

In step 266, the control module 150 controls combustion based on the airflow estimates. For example, the control module 150 may control an amount of fuel injected based on an average of the airflow estimates (i.e. the sensors not in the failure state). Control may then return to step 252.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An engine control system for a homogenous charge compression ignition (HCCI) engine, comprising:
an airflow determination module that generates a first plurality of estimates of airflow into the HCCI engine when the HCCI engine is operating in a first combustion mode, wherein the first plurality of estimates are based on an intake manifold absolute pressure (MAP), a mass air flow (MAF) rate, and a camshaft position; and
a sensor diagnostic module that determines a state of at least one of a first plurality of sensors based on a predetermined threshold and differences between one of the first plurality of estimates and others of the first plurality of estimates, wherein the first plurality of sensors includes a MAP sensor, a MAF sensor, and a camshaft sensor.

2. The engine control system of claim 1, wherein the first combustion mode includes HCCI combustion.

3. The engine control system of claim 1, wherein the sensor diagnostic module determines that one of the first plurality of sensors is in a failure state when differences between one of the first plurality of estimates that corresponds to the one of the first plurality of sensors and the others of the first plurality of estimates are greater than the predetermined threshold.

4. The engine control system of claim 1, wherein the airflow determination module generates a second plurality of estimates of airflow into the HCCI engine when the HCCI engine is operating in a second combustion mode, wherein the second plurality of estimates are based on the MAP, the MAF, the camshaft position, and a position of a throttle.

5. The engine control system of claim 4, wherein the second combustion mode includes spark ignition (SI) combustion.

6. The engine control system of claim 4, wherein the sensor diagnostic module determines a state of at least one of a second plurality of sensors based on the predetermined threshold and differences between one of the second plurality of estimates and others of the second plurality of estimates, wherein the second plurality of sensors include the MAP sensor, the MAF sensor, the camshaft sensor, and a throttle position sensor (TPS).

7. The engine control system of claim 6, wherein the sensor diagnostic module determines that one of the second plurality of sensors is in the failure state when differences between one of the second plurality of estimates that corresponds to the one of the second plurality of sensors and the others of the second plurality of estimates are greater than the predetermined threshold.

8. The engine control system of claim 4, further comprising:
a combustion mode determination module that determines whether the HCCI engine is operating in the first or second combustion modes based on at least one of a state of the throttle, a state of a spark plug, and a pressure in a cylinder.

9. The engine control system of claim 1, further comprising:
the MAF sensor, wherein the MAF sensor measures the MAF;
the MAP sensor, wherein the MAP sensor measures the MAP; and
the camshaft sensor, wherein the camshaft sensor measures the position of the camshaft.

10. The engine control system of claim 6, further comprising:
the TPS sensor, wherein the TPS sensor measures the position of the throttle.

11. A method for operating a homogenous charge compression ignition (HCCI) engine, comprising:
generating a first plurality of estimates of airflow into the HCCI engine when the HCCI engine is operating in a first combustion mode, wherein the first plurality of estimates are based on an intake manifold absolute pressure (MAP), a mass air flow (MAF) rate, and a camshaft position; and
determining a state of at least one of a first plurality of sensors based on a predetermined threshold and differences between one of the first plurality of estimates and others of the first plurality of estimates, wherein the first plurality of sensors includes a MAP sensor, a MAF sensor, and a camshaft sensor.

12. The method of claim 11, wherein the first combustion mode includes HCCI combustion.

13. The method claim 11, further comprising:
determining that one of the first plurality of sensors is in a failure state when differences between one of the first plurality of estimates that corresponds to the one of the first plurality of sensors and the others of the first plurality of estimates are greater than the predetermined threshold.

14. The method of claim 11, further comprising:
generating a second plurality of estimates of airflow into the HCCI engine when the HCCI engine is operating in a second combustion mode, wherein the second plurality of estimates are based on the MAP, the MAF, the camshaft position, and a position of a throttle.

15. The method of claim 14, wherein the second combustion mode includes spark ignition (SI) combustion.

16. The method of claim 14, further comprising:
determining a state of at least one of a second plurality of sensors based on the predetermined threshold and differences between one of the second plurality of estimates and others of the second plurality of estimates, wherein the second plurality of sensors include the MAP sensor, the MAF sensor, the camshaft sensor, and a throttle position sensor (TPS).

17. The method of claim 16, further comprising:
determining that one of the second plurality of sensors is in the failure state when differences between one of the second plurality of estimates that corresponds to the one of the second plurality of sensors and the others of the second plurality of estimates are greater than the predetermined threshold.

18. The method of claim 14, further comprising:
determining whether the HCCI engine is operating in the first or second combustion modes based on at least one of a state of the throttle, a state of a spark plug, and a pressure in a cylinder.

19. The method of claim 11, further comprising:
measuring the MAF using the MAF sensor;
measuring the MAP using the MAP sensor; and
measuring the position of the camshaft using the camshaft sensor.

20. The method of claim 16, further comprising:
measuring the position of the throttle using the TPS sensor.

* * * * *